Nov. 29, 1966  J. L. PITTENGER  3,288,483
PALLET CART
Filed May 17, 1965  2 Sheets-Sheet 1
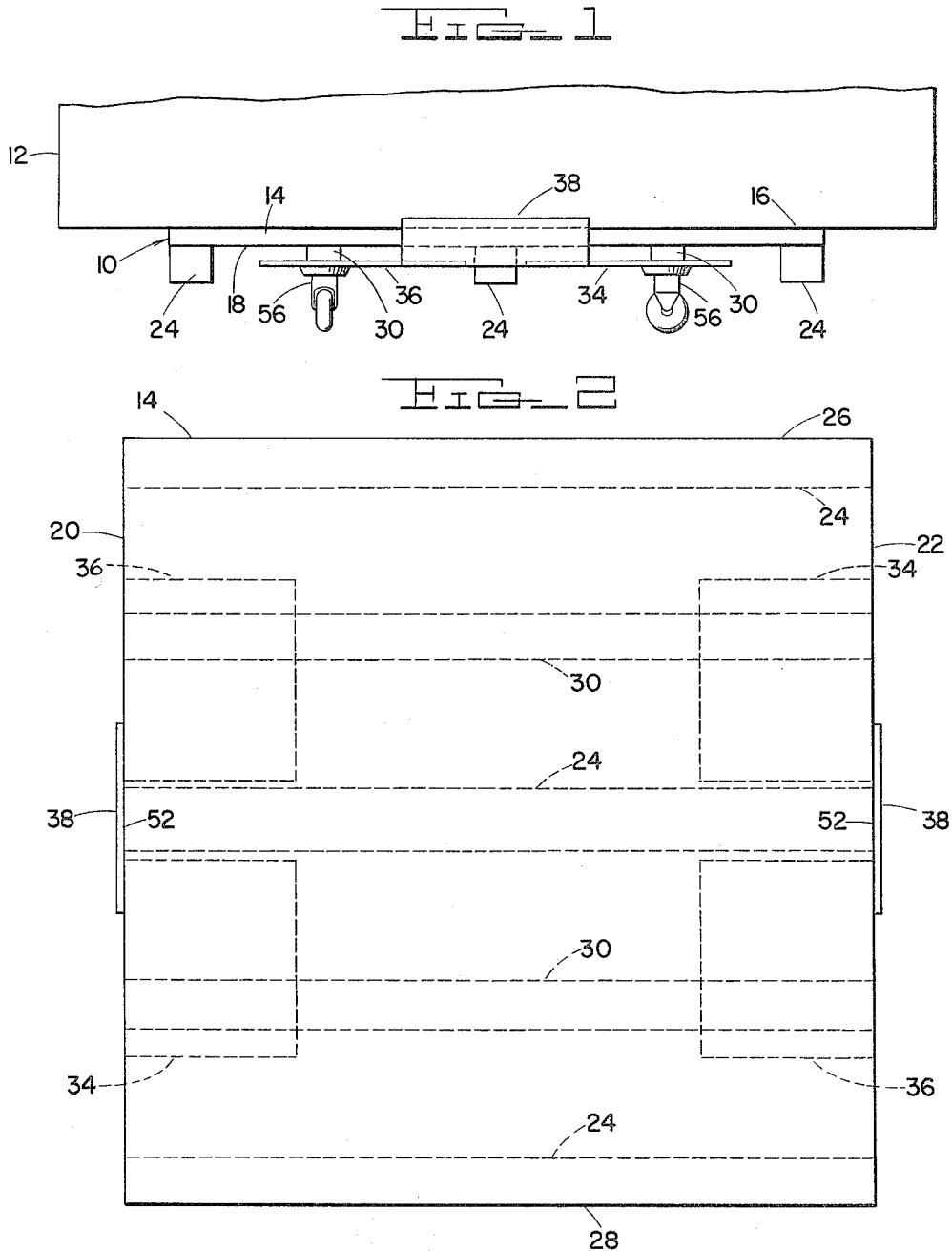
INVENTOR
JOHN L. PITTENGER
BY Wood, Gust + Irish
ATTORNEYS

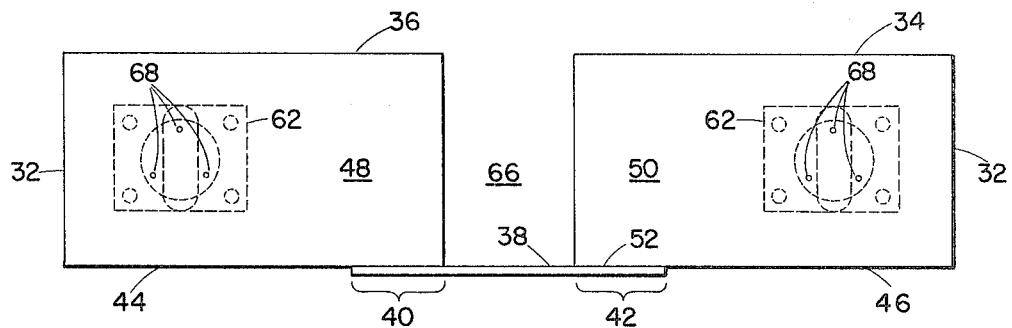
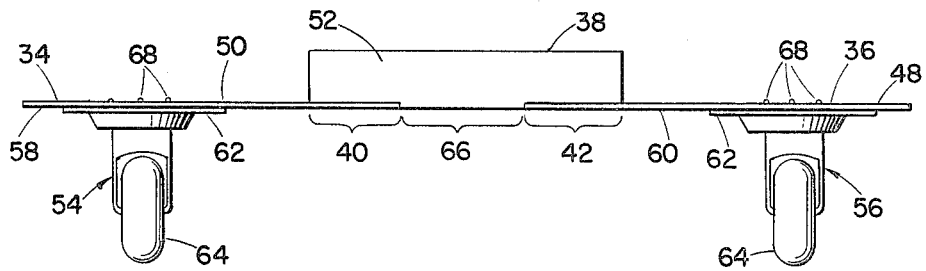

United States Patent Office 3,288,483
Patented Nov. 29, 1966

3,288,483
PALLET CART
John L. Pittenger, Huntington, Ind., assignor to North American Properties, Inc., Fort Wayne, Ind., a corporation of Indiana
Filed May 17, 1965, Ser. No. 457,909
6 Claims. (Cl. 280—79.1)

The present invention relates generally to the class of devices commonly known as dollies, carts, and the like, which are inserted beneath loads for rendering them movable and more specifically, to a cart which can be inserted beneath one end of a conventional pallet for supporting the same and moving the pallet about a warehouse.

Heretofore, warehouses have stored their goods on pallets which can be engaged to the tines of a fork-lift truck to be moved about and stacked one upon the other. Conventional pallets are available in three standard sizes measuring seven feet by five feet, six feet square, and eight feet by four feet. These pallets are conventionally loaded to a height of seven feet, six feet, and eight feet, respectively. The normal practice of warehousemen is to stack three pallets and their loads one on top of each other for storage and to unload them selectively when needed. In the past, all of the moving of the pallets and their loads has been done by fork-lift trucks; however, this procedure is inefficient for small moves, and cannot be used to load several specific sizes of trailer trucks as will be hereinafter mentioned. Heretofore, such moves have been accomplished manually. Therefore, it is desirable to provide a cart on which pallets may be placed and rendered movable.

Each of the above-mentioned standard pallets comprises a base portion having an upwardly facing flat surface and a plurality of elongated supporting members or skids secured to and depending from the underside of the base portion and extending between the opposite ends thereof. Referring specifically to those pallets used in the household goods moving industry, each of the pallets is made of wood and has five elongated supporting members. Three of the supporting members are skids secured to the underside of the base portion of the pallet. The skids are positioned adjacent to the center and the opposite peripheral boundaries of the base, respectively, in general parallelism with each other. Conventionally, skids have a cross-section which measures four inches square. Intermediate each pair of skids, respectively, are secured two supporting members having a cross-section measuring one by four inches spaced apart and parallel to the aforementioned skids and positioned twenty-five inches apart from each other. These last-mentioned two supporting members provide four inch wide surfaces for engagement with the tines of a fork-lift truck when the pallet is lifted or moved. While each of the conventionally sized pallets have the last-mentioned two supporting members spaced twenty-five inches apart so that each of the members engage a tine of a fork-lift truck when the conventional pallets are lifted, the aforementioned skids are spaced apart various distances corresponding to the different dimensions of the pallets. Therefore, it is desirable that any cart that may be provided to support such pallets and to render them movable be designed to accommodate the various spacings of the aforementioned skids and to support the pallet a suitable distance from the warehouse floor such that the aforementioned skids which depend from the base a distance longer than the last-mentioned two supporting members be clear of the floor.

It is therefore the primary object of this invention to provide a pallet cart for supporting conventional pallets clear of the floor and rendering the pallets movable.

It is another object of this invention to provide a pallet cart for supporting one end of a conventional pallet clear of the floor without regard to the spacing of the skids of the pallet.

It is still another object of this invention to provide a pallet cart which engages the two intermediate and spaced apart supporting members, which are conventionally provided for engagement by the tines of a fork-lift truck, for supporting the pallet clear of the floor and rendering the pallet movable.

A further object of this invention is to provide a pallet cart which engages the two intermediate and spaced apart supporting members, conventionally provided for engagement by the tines of a fork-lift truck, adjacent one end of the pallet for supporting that end of the pallet clear of the floor.

Still further an object of this invention is to provide a pallet cart for supporting a pallet without regard to the spacing of the skids of the pallet clear of the floor, the upwardly facing surface of the pallet being provided with means protruding therefrom for engagement with the intermediate supporting members of the pallet, which are conventionally provided for engagement with the tines of a fork-lift truck, to frictionally secure the pallet to the pallet cart.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary end view of a conventional pallet loaded with a carton and supported by the pallet cart of this invention;

FIG. 2 is a top view of a conventional pallet showing the supporting members of the pallet in dotted lines and having a pair of pallet carts of this invention supporting the opposite ends thereof, the outlines of which are also shown in dotted lines;

FIG. 3 is a top view of the pallet cart of this invention; and

FIG. 4 is a side view of the pallet cart of this invention viewed from a direction opposite to the direction the pallet cart is viewed in FIG. 1.

In the broader aspects of this invention there is provided a pallet cart comprising a frame having an upwardly facing and flat surface and a member secured to a peripheral edge thereof with a second flat surface which is perpendicular and facing toward the surface of the frame. Two casters are swively secured to the underside of the frame in spaced apart relation and means are provided which protrude from the flat surface of the frame in registry with the casters for engaging a portion of a pallet and frictionally holding the pallet on the frame and combining with said member for restricting lateral movement of the pallet on the frame.

Referring to the drawings and more specifically to FIGS. 1 and 2, there is shown a conventional pallet 10 which is loaded with a carton 12 and generally comprises a base 14 having an upwardly facing flat surface 16 and several elongated supporting members 24, 30 secured to and depending from the base 14. Base portion 14 has a downwardly facing surface 18 to which members 24, 30 are secured. Members 24 are conventionally called skids and are secured to the base portion 14 adjacent to the center and opposite peripheral boundaries thereof, respectively, in general parallelism with each other. Positioned intermediate each pair of skids 24 are the members 30. Each of the skids 24 and the supporting members 30 are parallel to each other. The members 30 are spaced apart from each other a distance corresponding to the distance between the tines of the conventional fork-lift truck such that the tines can be engaged with the members 30 and the pallet may be thereby lifted and moved about by the truck. Conventionally, the skids 24 depend from the base 14 a distance longer than the members 30 such that the tines of the truck can be positioned beneath the members 30 when the pallet 10 rests on the floor of a warehouse and is supported by skids 24. In a specific embodiment, the members 30 are spaced apart twenty-five inches from center to center.

Now referring to FIGS. 3 and 4, there is shown the pallet cart of this invention which comprises a frame 32 having two spaced apart plates 34, 36 which are secured to each other by an intermediate member 38 having opposite end portions 40, 42 secured to aligned peripheral edges 44, 46 of the plates 36, 34, respectively. Plates 36, 34 have upwardly facing and flat surfaces 48, 50 respectively, which lie in the same plane and upon which members 30 of the pallet 10 rest, as will be mentioned hereinafter. Member 38 has a flat surface 52 which is perpendicular to and facing toward surfaces 48, 50.

Surfaces 48, 50 and 52 respectively partially define the bottom and one side of an open space free of tangible structure immediately above surfaces 48, 50. This space has an open top, open ends and an open side opposite to surface 52. Plates 34 and 36 are spaced apart from each other thereby providing an elongated opening 66 therebetween. Opening 66 extends from surface 52 and edges 44, 46 of plates 34 and 36, respectively, generally perpendicularly to surface 52. Plates 34, 36 and surface 52 respectively define the opposite sides and one end of opening 66. The other end of opening 66 is open. The frame 32 has a second open surface free of tangible structure immediately beneath opening 66. The first mentioned open space accommodates a portion of the base 14 of the pallet 10 and the opening 66 and the second-mentioned space accommodates a supporting member 24 when pallet 10 is positioned on the cart of this invention as shown in FIGS. 1 and 2.

Two casters 54, 56 are secured to the underside 58, 60 of the plates 36, 34, respectively. Casters 54, 56 are conventional and comprise base plates 62 to which wheels 64 are swivelly secured. Base plates 62 are secured to plates 36, 34, thereby providing the wheels 64 to be swivelly secured to plates 36, 34, as hereinabove mentioned.

Protruding from the surfaces 48, 50 at positions in registry with the casters 54, 56, respectively, are several beads, ridges, knobs, or other protuberances 68 which provide frictional surfaces for holding the pallet 10 resting on surfaces 48, 50 and restricting lateral movment of the pallet with respect to the plates 34, 36, as will be mentioned hereinafter.

In a specific embodiment of this invention, plates 32, 34 are spaced apart four and one half inches, thereby providing an opening 66 in frame 32 having a lateral dimension of four and one half inches. Plates 34, 36 measure eight inches by fourteen and three-quarters inches and are connected by intermediate member 38 which is twelve inches long and has a surface 52 which is two inches high. End portions 40, 42 of member 38 measure three and three-quarters inches long. Casters 54, 56 are secured to plates 34, 36 in spaced apart relation twenty-five inches from center to center. Protuberances 68, in the specific embodiment, are beads formed by spot welding of the plates 62 of casters 54, 56 to plates 34, 36 respectively. The preferred casters 54, 56 for the specific embodiment of this invention have four inch diameter wheels made of plastic or hard rubber swivelly mounted to plates 62 in such a manner that the distance from plates 62 measured diametrically of wheels 64 to the outermost wheel surface is five and three-quarter inches. In this embodiment, plates 34, 36 and member 38 are preferably made of five-sixteenths inch steel plate secured together by welding, brazing or other conventional means.

In operation, the pallet cart of this invention is positioned adjacent opposite ends of a pallet 10, as illustrated in FIGS. 1 and 2. Members 30 of pallet 10 are positioned in registry with casters 54, 56 and central skid 24 protrudes through opening 66 of frame 32 and depends beneath plates 34, 36. The pallet cart is slid beneath pallet 10 to the extend that surface 52 of member 38 is contiguous with the end of the pallet. Thus, the pallet is prevented from moving beyond member 38. In this position, protuberances 68 engage members 30 and frictionally hold pallet 10 to surfaces 48, 50 of plates 36, 34, respectively. Protuberances 68 in combination with member 38 restrict lateral movement of pallet 10 on surfaces 48, 50.

Referring now to FIGS. 1 and 2, it can be seen that by use of a pair of pallet carts of this invention, a pallet 10 can be supported clear of a warehouse floor and rendered movable by means of casters 54, 56. Further, the pallet cart of this invention can be used as above-described with all of the standard pallets which have skids 24 and members 30, as aforementioned. While skids 24 and members 30 on any specific pallet may deviate from the parallel relationship above-described and may be spaced apart a distance which is not conventional, the pallet cart of this invention can be used so long as center skid 24 is of a size that will fit opening 66 of frame 32, and members 30 are positioned so that they contact a portion of surfaces 48, 50 of plates 36, 34, respectively. Further pallets which are not conventionally made can also be used with the pallet cart of this invention so long as the pallet has a flat underside surface which can be engaged with surfaces 48, 50, respectively.

The pallet cart of this invention provides that pallets which heretofore could be moved only by use of fork-lift trucks are now rendered movable by means of casters 54, 56, and can be moved manually if desired. Such a provision is especially desirable for short moves in cramped quarters where heretofore a fork-lift truck was rendered inoperable. One such use is the loading of a conventional moving van trailer which heretofore has been provided with extra large doors on opposite sides thereof so that the fork-lift trucks could enter the van and turn about. However, by use of the pallet cart of this invention, these specially designed trailers are no longer required, and all trailers can now be conventionally equipped with a single side door so long as the side door is large enough to accommodate the pallet cart and the load thereon, thereby saving the additional expense of providing the extra doors of larger size on the specially designed vans above-mentioned.

Another such use is the moving of loaded pallets between floors of a multi-storied warehouse. Such warehouses are conventionally provided with elevators, however, the elevators are not large enough or strong enough to lift a loaded fork-lift truck from one floor to the next. Consequently, pallets could not be used on floors above the first floor. However, loaded pallets supported by the pallet carts of this invention can be rolled into warehouse elevators and therefrom can be transported onto any floor of the warehouse.

Still further, due to the novel design of the pallet cart of this invention, it may be placed under a loaded pallet by lifting one end of the loaded pallet at at time thereby rendering the pallet cart usable without additional manpower being required to insert the pallet cart under a loaded pallet.

While there have been described above the principles of this invention in connection with specific apparatus, it is to be clearly understood that this description is made only by way of example and not as a limitation to the scope of this invention.

What is claimed is:

1. The combination comprising a pallet supported at one end by a pallet cart, said pallet having a base with an upwardly facing flat surface and five elongated supporting members secured to and depending from the underside of said base and extending between opposite ends thereof, three of said supporting members being adjacent to the center and opposite peripheral boundaries of said base, the remaining two supporting members being intermediate said three members and spaced apart from each other a distance whereby said pallet may be lifted with said surface being horizontal by a fork truck having its tines in registry with said two members, said three members depending from said base a distance greater than said two members, said pallet cart having a frame comprising two spaced apart plates secured to each other by an intermediate member having opposite end portions secured to aligned peripheral edges of said plates, respectively, said plates having upwardly facing and flat first surfaces which lie in the same plane and upon which said two members rest, the center one of said three support members being intermediate said two plates and said two plates being intermediate the two outer ones of said three support members, said intermediate member having a second flat surface which is perpendicular to and facing toward said first surfaces, said second flat surface being adjacent to said one pallet end whereby said pallet is prevented from moving beyond said intermediate member on said plates, two casters swivelly secured to the underside of said plates at positions in registry with said two pallet support members, respectively, and means protruding from said first surfaces in registry with and engaging said two support members for frictionally holding said pallet on said plates and restricting the lateral movement thereof.

2. The combination of claim 1 wherein said means comprises a plurality of welding beads securing said casters to said plates, respectively.

3. The combination comprising a pallet supported at one end by a pallet cart, said pallet having a base with an upwardly facing flat surface and three elongated supporting members secured to and depending from the underside of said base, one of said supporting members being adjacent to the center of said base, the remaining two supporting members being spaced apart from and generally aligned with said one supporting member, said two supporting members being spaced apart from each other a distance whereby said pallet may be lifted with said surface being horizontal by a fork truck having its tines in registry with said two members, said pallet cart having a frame comprising two spaced apart plates secured to each other by an intermediate member having opposite end portions secured to said plates, respectively, said plates having upwardly facing and flat first surfaces which lie in the same plane and upon which said two members rest, said one supporting member being intermediate said two plates and depending from said base a distance greater than said two supporting members, said intermediate member having a second flat surface which is perpendicular to and facing toward said first surfaces, said second flat surface being adjacent to said one pallet end whereby said pallet is prevented from moving beyond said intermediate member on said plates, two casters swivelly secured to the underside of said plates at positions in registry with said two pallet members, respectively, and means protruding from said first surfaces in registry with and engaging said two support members for frictionally holding said pallet on said plates and restricting the lateral movement thereof.

4. The combination comprising a pallet supported at one end by a pallet cart, said pallet having a base with an upwardly facing flat surface and one elongated supporting member secured to said base and depending therefrom, said pallet cart having a frame with an upwardly facing and flat first surface, two casters swivelly secured to the underside of said frame in spaced apart relation, said frame having a second surface upstanding from said first surface, said second surface extending generally parallel to the direction of a line drawn between said casters, said first and second surfaces respectively defining the bottom and one portion of the upstanding sides of a first open space free of tangible structure immediately above said first surface, said first open space having an open top, the remaining portion of said sides of said first open space also being open, a portion of said pallet base being in said first open space, said frame having an elongated opening therein extending from said second surface and between said casters, said frame and said second surface respectively defining the opposite sides and one end of said opening, the other end of said opening remote from said second surface being open, said frame having a second open space free of tangible structure immediately below said opening which communicates with said first open space, said second open space having an open end adjacent to said remote end of said opening, a portion of said pallet supporting member being positioned in said opening and said second open space, and means protruding from said first surface and engaging a portion of said base for frictionally holding said pallet on said first surface and restricting the lateral movement thereof.

5. A cart comprising a frame having an upwardly facing and flat first surface, two casters swivelly secured to the underside of said frame in spaced apart relation, said frame having a second surface upstanding from said first surface, said second surface extending generally parallel to the direction of a line drawn between said casters, said first and second surfaces respectively defining the bottom and one portion of the upstanding sides of a first open space free of tangible structure immediately above said first surface, said first open space having an open top, the remaining portion of said sides of said first open space also being open, said frame having an elongated opening therein extending from said second surface and between said casters, said frame and said second surface respectively defining the opposite sides and one end of said opening, the other end of said opening remote from said second surface being open, said frame having a second open space free of tangible structure immediately below said opening which communicates with said first open space, said second open space having an open end adjacent to said remote end of said opening, and means protruding from said first surface for frictionally resisting movement of a load placed on said first surface.

6. A cart comprising a frame having two spaced apart plates secured to each other by an intermediate member having opposite end portions secured to aligned peripheral edges of said plates, respectively, said plates having upwardly facing and flat first surfaces which lie in the same plane, tow casters swivelly secured to the underside of said plates, respectively, said intermediate member having a second flat surface upstanding from said first surface, said second surface extending generally parallel to the direction of a line drawn between said casters, said first and second surfaces respectively defining the bottom and one portion of the upstanding sides of a first open space free of tangible structure immediately above said first surface, said first open space having an open top, the remaining portion of said sides of said first open space also being open, said plates and said second surface respectively defining the opposite sides and one end of an elongated opening in said frame, said opening generally perpendicularly extending from said second surface and between said casters, the other end of said opening remote from said second surface being open, said frame having a second open space free of tangible structure immediately below said opening which communicates with said first open space, said second open space having an open end adjacent to said remote end of said opening, and means protruding from said first surface for frictionally resisting movement of a load placed on said first surface.

References Cited by the Examiner
UNITED STATES PATENTS

| | | | |
|---|---|---|---|
| 1,422,730 | 7/1922 | Wood | 280—47.13 |
| 1,604,723 | 10/1926 | Rutherford | 280—47.13 |
| 2,472,952 | 6/1949 | Lennard | 280—79.1 X |

FOREIGN PATENTS 1,089,242  3/1955  France.

MILTON BUCHLER, *Primary Examiner.*

BENJAMIN HERSH, *Examiner.*

C. C. PARSONS, *Assistant Examiner.*